United States Patent [19]

Messmer et al.

[11] 4,370,454

[45] Jan. 25, 1983

[54] PREPARATION OF MALEIC ANHYDRIDE COPOLYMERS

[75] Inventors: Karlheinz Messmer, Ludwigshafen; Hermann Fischer; Heinrich Hartmann, both of Limburgerhof; Walter Denzinger, Speyer; Rolf Schneider, Mannheim; Klaus Wulz, Lambsheim; Hans-Juergen Raubenheimer, Ketsch, all of Fed. Rep. of Germany

[73] Assignee: BASF Aktiengesellschaft, Rheinland-Pfalz, Fed. Rep. of Germany

[21] Appl. No.: 350,356

[22] Filed: Feb. 19, 1982

[30] Foreign Application Priority Data

Mar. 4, 1981 [DE] Fed. Rep. of Germany ....... 3108100

[51] Int. Cl.$^3$ .............................................. C08L 37/00
[52] U.S. Cl. ...................................... 526/88; 526/271
[58] Field of Search ........................... 526/88, 271, 68

[56] References Cited

U.S. PATENT DOCUMENTS

| 2,299,189 | 10/1942 | Swan | 260/90 |
| 2,782,182 | 2/1957 | Verburg | 260/78.5 |
| 2,938,016 | 5/1960 | Johnson | 260/78.5 |
| 4,135,043 | 1/1979 | Kast et al. | 526/63 |
| 4,141,934 | 2/1979 | Wingler et al. | 260/881 |
| 4,243,784 | 1/1981 | Akiman et al. | 526/88 |
| 4,255,542 | 3/1981 | Brown et al. | 526/88 |

Primary Examiner—Joseph L. Schofer
Assistant Examiner—Bernard Lipman
Attorney, Agent, or Firm—Oblon, Fisher, Spivak, McClelland & Maier

[57] ABSTRACT

Maleic anhydride copolymer powders are prepared by a process wherein a solution or dispersion of maleic anhydride in an alkyl vinyl ether and/or an alkene, containing from 3 to 25 moles of the alkyl vinyl ether and/or alkene per mole of maleic anhydride, is brought into contact with a powder bed under polymerization conditions, and is polymerized in the bed while the reaction mass is circulated and the powder state is maintained, and the heat generated during polymerization is removed by evaporating excess monomer which boils lower than maleic anhydride.

6 Claims, No Drawings

PREPARATION OF MALEIC ANHYDRIDE COPOLYMERS

This invention relates to a process for the preparation of a maleic anhydride copolymer powder by copolymerization, wherein a solution or dispersion of maleic anhydride in a $C_1$–$C_8$-alkyl vinyl ether and/or a $C_3$–$C_{10}$-alkene is brought into contact with a powder bed under polymerization conditions, and is polymerized in the bed whilst the reaction mass is circulated and the powder state is maintained, and the heat generated during polymerization is removed by evaporating excess monomer which boils lower than maleic anhydride.

U.S. Pat. No. 4,135,043 discloses a process for the preparation of hydrophilic polymer powders, using water alone as the auxiliary fluid. However, the use of water as the diluent has certain disadvantages, since the polymerization of the monomers in part begins even in the equipment used to feed the monomers into the polymerization zone, and the polymerization must be carried out far above 100° C. in order to remove the water from the polymerization zone under atmospheric pressure. Copolymers containing maleic anhydride cannot be prepared by this process because maleic acid forms from the maleic anhydride and water under the polymerization conditions.

Copolymers of maleic anhydride and alkyl vinyl ethers and/or alkenes are conventionally prepared by free radical precipitation polymerization of the monomer mixture in an aromatic hydrocarbon in the presence of a protective colloid. The isolation of the polymer powder as a rule requires an expensive process step, particularly where it is important substantially to remove the aromatic hydrocarbons from the polymer.

It is an object of the present invention to provide a process for the preparation of maleic anhydride copolymer powders by copolymerization of maleic anhydride with alkyl vinyl ethers and/or alkenes in the presence of a polymerization initiator, by means of which solvent-free products are obtained in a relatively simple manner.

We have found that this object is achieved by a process wherein a solution or dispersion of maleic anhydride in an alkyl vinyl ether and/or an alkene, containing from 3 to 25 moles of the alkyl vinyl ether and/or alkene per mole of maleic anhydride, is brought into contact with a powder bed under polymerization conditions, and is polymerized in the bed whilst the reaction mass is circulated and the powder state is maintained, and the heat generated during polymerization is removed by evaporating excess monomer which boils lower than maleic anhydride.

Vinyl ethers which are used for copolymerization with maleic anhydride are either gaseous or liquid at room temperature. Examples of suitable alkyl vinyl ethers are $C_1$–$C_8$-alkyl vinyl ethers, preferably $C_1$–$C_4$-alkyl vinyl ethers, eg. methyl vinyl ether, ethyl vinyl ether, propyl vinyl ether, isopropyl vinyl ether, isobutyl vinyl ether, n-butyl vinyl ether and vinyl 2-ethylhexyl ether.

The principal suitable alkenes are those of 3 to 10 carbon atoms, eg. propylene, isobutene, n-butene, diisobutene, cyclopentene, hexene, cyclohexene, n-octene, cyclooctene and 1-decene. They may be represented by the formula

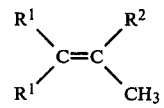

where $R^1$ and $R^2$ are each H or $C_1$–$C_7$-alkyl and can also be linked to form a hydrocarbon ring. Of this group of monomers, isobutene, 1-hexene and diisobutene are preferred. Amongst the higher alkenes, those which have a terminal double bond are principally used.

Maleic anhydride and alkyl vinyl ethers, or maleic anhydride and alkenes, are known to polymerize in the molar ratio of 1:1, to form alternating copolymers. The essential feature of the process according to the invention is that from 3 to 25, preferably from 5 to 15, moles of an alkyl vinyl ether or alkene or of a mixture of compounds of the two categories are employed per mole of maleic anhydride.

The excess alkyl vinyl ethers and/or alkenes serve as means of removing the heat generated during polymerization and the heat generated by circulating the powder bed. Monomer mixtures of maleic anhydride, one or more alkyl vinyl ethers and one or more alkenes can also be copolymerized. For example, copolymers of maleic anhydride, isobutyl vinyl ether and diisobutene, or copolymers of maleic anhydride, isobutene and ethyl vinyl ether, may be prepared. Copolymers which contain either two or more alkyl vinyl ethers together with maleic anhydride, or two or more alkenes together with maleic anhydride, are prepared similarly. The copolymerization is always carried out in the absence of water, in order to prevent hydrolysis of the maleic anhydride.

The maleic anhydride copolymers can, if desired, be modified by copolymerizing the above monomers in the presence of other monomers. Examples of the latter are ethylenically unsaturated $C_3$–$C_5$-carboxylic acids, their esters, amides, nitriles and/or vinyl esters, and styrene. Amongst the ethylenically unsaturated carboxylic acids, acrylic acid and methacrylic acid are preferred. The esters of the ethylenically unsaturated $C_3$–$C_5$-carboxylic acids are in the main derived from monohydric $C_1$–$C_{18}$-alcohols, preferably $C_1$–$C_8$-alcohols. Preferred other monomers are the acrylic acid estes and methacrylic acid esters of methanol, ethanol, n-butanol, isobutanol and 2-ethylhexanol. Amongst the amides and nitriles, acrylonitrile, methacrylonitrile, acrylamide and methacrylamide are principally used. The maleic anhydride copolymers can also be modified by copolymerization with dialkylamino-$C_1$–$C_6$-alkyl acrylates or the corresponding methacrylates, for example dimethylaminoethyl acrylate, diethylaminoethyl acrylate, diethylaminopropyl acrylate and dimethylaminopropyl methacrylate. A further group of suitable monomers comprises vinyl estes derived from saturated carboxylic acids of 2 to 22 carbon atoms. Vinyl acetate and vinyl propionate are preferred. The monomers of this group are only used where it is desired to modify the maleic anhydride copolymers, and they contribute at most 25 mole %, based on maleic anhydride, to the structure of the copolymers.

Further modification of the properties of the maleic anhydride copolymers is possible by carrying out the copolymerization in the additional presence of crosslinking monomers. This increases the molecular weight of the copolymers. Examples of suitable crosslinking monomers are compounds having two or more ethylenically unsaturated double bonds, eg. divinylbenzene, divinyl ketone, 1,4-butadiene, ethylene glycol diacrylate, ethylene glycol dimethacrylate, divinyl ether, divinyldioxane, polyalkenyl polyethers, eg. polyallyl ethers and polyvinyl ethers of polysaccharides, diallylacrylamide, polyallylsilanes and polyvinylsilanes, eg. tetravinylsilane, triallyl cyanurate, butanediol divinyl ether, glycol divinyl ether and diacrylates, eg. butanediol dimethacrylate and glycol diacrylate. Amongst this group of crosslinking monomers, the polyallyl ethers, eg. triallyl ethers and tetraallyl ethers of sucrose and of pentaerythritol, and hexaallyl ethers of sucrose, are particularly important. The crosslinking monomers are employed in amounts of from 0.01 to 5, preferably from 0.1 to 2, mole %, based on maleic anhydride.

The copolymerization is initiated by means of the conventional free radical catalysts. Examples of suitable catalysts are organic peroxides, eg. dialkyl peroxides, perketals, alkyl per-esters, diacyl peroxides, peroxydicarbonates and hydroperoxides, azo compounds and carbon-carbon-labile compounds, eg. hexaphenylethane and 2,3-dimethyl-2,3-diphenylbutane. The copolymerization can also be carried out at a relatively low temperature (room temperature), provided a redox catalyst, for example a combination of an organic peroxide and ascorbic acid or of a peroxydicarbonate and benzoin, is used as the polymerization initiator. It is also possible to employ the polymerization initiator conjointly with a suitable accelerator, for example an amine derived from a cyclic or phenyl structure, the amine being used by itself or together with an organic compound of a transition metal. The copolymerization can also be carried out with a mixture of different polymerization initiators having different decomposition temperatures.

The conventional regulators, in conventional amounts, may be used to regulate the molecular weight of the copolymer. Examples of suitable regulators are mercaptans, eg. dodecylmercaptan, aldehydes, eg. butyraldehyde, alcohols, eg. isopropanol, and organic complex compounds of iron, manganese, cobalt, nickel and copper, eg. the acetylacetonates or naphthenates. Provided they are dispersible, inorganic and organic transition metal salts may also be useful regulators.

The polymerization of the monomers is effected in a powder bed. Suitable powders may be inorganic or E powders are usained. onomers having acid groups, eg. acrylic acid or methacrylic acid, which are to be copolymerized with maleic anhydride and an alkyl vinyl ether and/or an alkene can also be partially or completely neutralized before, during or after copolymerization by passing ammonia or an amine into the powder bed. Preferably, however, an inert polymer powder corresponding in composition to the polymer freshly formed from the monomer mixture is introduced into the polymerization zone. Should no polymer powder be available already, such a polymer can be produced by conventional methods, for example by masspolymerizing the monomers and comminuting the solid polymer, or by polymerizing a water-in-oil emulsion of the monomers and precipitating and isolating the polymer formed, or by precipitation polymerization or bead polymerization. The particle size of the polymer powder or of the inert inorganic powder is from 0.05 to 4 mm, preferably from 0.5 to 2 mm.

Examples of polymerization reactors which may be used are kettles and stirred autoclaves, where appropriate as a multi-stage cascade, and combinations of stirred kettles with a downstream flow tube.

The material in the polymerization zone is kept in a powder state throughout the duration of the polymerization, and at the same time thorough mixing of the reaction mass is provided. Maleic anhydride, in the form of a solution or dispersion in one or more of the monomers in question, is applied in a finely dispersed form onto the powder in the polymerization zone, as a rule by spraying the monomer solution or allowing the solution to run through a tube onto the powder bed. In some cases it may be advantageous if the feed point of the monomer solution is actually in the powder bed. In other cases, the atomizing of the monomer solution may similarly be effected in the powder bed. The copolymerization takes place in a quasi-steady state, ie. the maleic anhydride, together with one or more other monomers, is fed to the polymerization reactor at the rate at which polymerization occurs. This process step may be carried out continuously or batchwise.

During polymerization, the reaction mass must be subjected to adequate circulation, preferably by stirring. The heat generated during polymerization and the heat resulting from the circulation of the powder are removed by evaporation of the lower-boiling monomers from the polymerization zone. To a lesser degree, a small proportion of the heat can also be removed by cooling the reactor wall. The monomer solutions fed to the powder bed as a rule contain from 3 to 30% by weight of maleic anhydride. The lower-boiling monomers which are preferably removed from the polymerization zone by distillation are condensed and recyled to the reactor in the desired ratio to the other monomers.

Maleic anhydride is in every case introduced into the polymerization zone as a solution or dispersion in one or more monomers. If more than one other monomer is used, these may be introduced into the polymerization zone separately from the maleic anhydride. As a rule, the form in which the peroxides are introduced into the polymerization zone is also as a solution or dispersion in a monomer.

The polymerization temperature can vary within a wide range and is from 20° to 170° C., preferably from 45° to 110° C. The maximum temperature is imposed by the melting point or softening range of the copolymer, and should be about 5° C. below the start of the softening range of the copolymer. The copolymerization is preferably carried out under atmospheric pressure but if very low-boiling monomers, eg. methyl vinyl ether or propylene, are to be copolymerized it is necessary to do so under superatmospheric pressure. On the other hand, to evaporate relatively high-boiling monomers during the copolymerization it may be necessary to work under reduced pressure. Accordingly, the range of pressures used for the copolymerization is from 0.05 to 100, preferably from 0.2 to 16, bar.

The residence time is from 0.2 to 15, preferably from 2 to 8, hours. The polymer is removed from the reaction zone either continuously, for example by means of a screw, or batchwise.

In order to prepare polymer powders having a particularly low monomer content, the main polymerization is followed by an after-polymerization. Polymerization in a cascade is particularly suitable for this procedure. In cascade polymerization, the powder discharged from the first reactor is transferred into a second reactor in which it is heated to a higher temperature. Moreover, a peroxide can be introduced into the after-polymerization reactor. Advantageously, the peroxides employed decompose at a higher temperature than that used for the main polymerization. The after-polymerization temperature is in general from 5° to about 80° C. above that of the main polymerization. For the after-polymerization, from 0.05 to 10, preferably from 0.15 to 5, mole % of a polymerization initiator are used per mole of residual monomers in the copolymer mixture.

The process according to the invention directly gives polymer powders which do not require further purification. A very important advantage of this procedure is the fact that solvent-free copolymer powders are obtained. The particle diameter of the powders is from 10 $\mu$m to 2 cm, preferably from 0.1 to 5 mm. A further advantage of the novel process over conventional processes is that virtually non-dusting copolymer powders are obtained.

Examples of the uses of the maleic anhydride copolymers in the form of their salts are as crust inhibitors for detergents, dispersants (especially for pigments in the manufacture of paper-coating compositions) paper sizes, adhesive auxiliaries, and thickeners, while the mono-$C_1$-$C_4$-alkyl esters are used as cosmetic auxiliaries. Copolymers of maleic anhydride containing cross-linking monomers as copolymerized units are in particular used as thickeners for aqueous polymer solutions or dispersions.

In the Examples, percentages are by weight, unless stated otherwise. The K values were determined by the method of H. Fikentscher, Cellulosechemie 13 (1932), 58-64 and 71-74, at 25° C.; $K=K.10^3$.

EXAMPLE 1

Preparation of a copolymer of maleic anhydride and vinyl ethyl ether in the molar ratio of 1:1

This copolymer was prepared batchwise, using as the polymerization reactor a cylindrical glass vessel of 5 liters capacity, equipped with a spiral stirrer and a descending condenser. A spray nozzle, entering the glass vessel, was used to spray the monomer mixture, together with the initiator, onto the initial charge of polymer powder. A nitrogen line also led into the glass vessel, so that the polymerization could be carried out under a nitrogen blanket. The vessel was heated by means of an oil bath. The monomer mixture was mixed with a solution of the polymerization initiator in vinyl ethyl ether in a static mixer. A heat exchanger was fitted into the line through which the monomer mixture was passed to the static mixer, so as to allow cooling where necessary. A separator was provided between the polymerization vessel and the condenser, in order to separate out any solids entrained by the stream of nitrogen or by the excess monomer being evaporated. 1,500 g of a nylon powder prepared from adipic acid and hexamethylenediamine, having a particle diameter of from 1 to 2 mm, were introduced into the apparatus described above and heated to 60° C., with thorough circulation.

A solution of 4.98 g of benzoin and 250 g of maleic anhydride in 1,506 g of vinyl ethyl ether was combined, in a static mixer, with an initiator solution consisting of 7.02 g of bis-(4-t-butylcyclohexyl) peroxydicarbonate and 3.37 g of dioctanoyl peroxide in 1,000 ml of vinyl ethyl ether, in a volumetric flow ratio of about 2:1, and the mixture was sprayed progressively, over 5 hours, onto the agitated bed of nylon powder. The molar ratio of maleic anhydride to vinyl ethyl ether was about 1:12, and the polymeization temperature was 60° C. During the polymerization, the material in the polymerization zone was maintained in the powder state and the excess ethyl vinyl ether (about 2,050 g) was continuously evaporated from the reaction zone by the heat liberated during polymerization and the energy introduced into the system as a result of stirring of the powder bed, the vapor being condensed in the descending condenser. The copolymer of maleic anhydride and ethyl vinyl ether, separated from the inert initial charge, had a K value of 47 (measured in 1% strength solution in cyclohexanone). The residual monomer content was less than 0.1%. After neutralization with sodium hydroxide the copolymer is employed as a scale inhibitor and graying inhibitor in domestic detergents.

EXAMPLE 2

Preparation of a copolymer of maleic anhydride and ethyl vinyl ether in the molar ratio of 1:1

1,500 g of a copolymer of maleic anhydride and ethyl vinyl ether, of particle diameter of from 1 to 2 mm, were introduced into the polymerization apparatus described in Example 1, and heated to 60° C. with constant circulation. A solution of 250 g of maleic anhydride, 4.98 g of benzoin and 0.24 g of iron (III) acetylacetonate in 1,506 g of ethyl vinyl ether was then combined with a solution of a polymerization initiator, consisting of 23.4 g of bis-(4-t-butylcyclohexyl) peroxydicarbonate and 10.1 g of dioctanoyl peroxide in 1,000 ml of ethyl vinyl ether, in the static mixer, in a volumetric flow ratio of about 2:1, and the mixture was sprayed continuously, over 6 hours, onto the bed of solids. The molar ratio of maleic anhydride employed to vinyl ethyl ether was about 1:12, and the polymerization temperature was 60° C. During the polymerization, the material in the polymerization zone was maintained in the powder state, and the excess ethyl vinyl ether was distilled off continuously. The copolymer obtained had a K value of 24 (measured in 1% strength solution in cyclohexanone) and a residual monomer content of less than 0.1%. After neutralization with sodium hydroxide, the copolymer is used as a pigment dispersant in the preparation of paper-coating compositions.

EXAMPLE 3

Preparation of a copolymer of maleic anhydride and vinyl isobutyl ether in the molar ratio of 1:1

1,200 g of a copolymer of maleic anhydride and vinyl isobutyl ether, of average particle diameter 0.1 mm, were introduced into the apparatus described in Example 1. The oil bath was set to 100° C. A solution of 250 g of maleic anhydride in 2,000 g of vinyl isobutyl ether was then combined with a solution of a polymerization initiator, consisting of 7.02 g of bis-(4-t-butylcyclohexyl) peroxydicarbonate and 3.37 g of dioctanoyl peroxide in 1,000 ml of vinyl isobutyl ether, in a volumetric flow ratio of 2.5:1, and the mixture was sprayed progressively, over 5 hours, onto the agitated bed of solids. The molar ratio of maleic anhydride employed to vinyl isobutyl ether was 1:11. During the polymerization, the material was maintained in the powder state, and the excess vinyl isobutyl ether was distilled off continuously. The polymer had a K value of 60 (measured on a 1% strength solution in acetone) and was virtually free from residual monomers.

EXAMPLE 4

Preparation of a copolymer of maleic anhydride and vinyl methyl ether in the molar ratio of 1:1

The polymerization apparatus used was as described in Example 1, except that it was made of steel instead of glass components. 1,500 g of a copolymer of maleic anhydride and vinyl methyl ether, of particle diameter of 1 to 2 mm, were introduced and heated to 60° C., with constant circulation. The pressure was brought to about 2.8 bar by introducing nitrogen. A solution of 250 g of maleic anhydride and 4.98 g of benzoin in 1,650 g of methyl vinyl ether was then combined with a solution of a polymerization initiator mixture, consisting of 7.02 g of bis-(4-t-butylcyclohexyl) peroxydicarbonate and 3.37 g of dioctanoyl peroxide in 500 g of methyl vinyl ether, in the static mixer in a volumetric flow ratio of 3.5:1, and the mixture was sprayed continuously, over 6 hours, onto the bed of solids. The molar ratio of maleic anhydride employed to vinyl methyl ether was about 1:14.5, and the polymerization temperature was 60° C. During the polymerization, the material in the polymerization zone was maintained in the powder state, and the excess methyl vinyl ether was continuously released via a constant-pressure valve. A copolymer of maleic anhydride and vinyl methyl ether in the molar ratio of 1:1 was obtained, having a K value of 40 (measured on a 0.1% strength solution in acetone).

EXAMPLE 5

Preparation of a copolymer of maleic anhydride, vinyl ethyl ether and acrylic acid in the molar ratio of 1:0.9:0.1

1,500 g of a copolymer of maleic anhydride and acrylic acid, of particle diameter of about 2 mm, were introduced into the polymerization apparatus described in Example 1, and were heated to 60° C. while being circulated. A solution of 250 g of maleic anhydride, 18.4 g of acrylic acid and 4.98 g of benzoin in 1,506 g of ethyl vinyl ether was then combined with a solution of an initiator mixture, consisting of 7.02 g of bis-(4-t-butylcyclohexyl) peroxydicarbonate and 3.37 g of dioctanoyl peroxide in 1,000 ml of vinyl ethyl ether in a static mixer, in a volumetric flow ratio of about 2:1, and the mixture was sprayed continuously, over 6 hours, onto the bed of solids. The molar ratio of maleic anhydride:acrylic acid:vinyl ethyl ether was 1:0.1:12 and the polymerization temperature was 60° C. During the polymerization, the material in the polymerization zone was kept in the powder state, and the excess ethyl vinyl ether was distilled off continuously by means of the heat generated during polymerization. 1,950 g of polymer having a K value of 45 (measured, after neutralization, at a concentration of 0.5% in 5% strength sodium chloride solution) were obtained. The copolymer is readily soluble in dilute sodium hydroxide solution and can be used as a pigment dispersant in the preparation of paper-coating compositions.

EXAMPLE 6

Preparation of a copolymer of maleic anhydride and 1-hexene 1,500 g of a maleic anhydride/1-hexene copolymer were introduced into the apparatus described in Example 1, and were heated to 80° C. A dispersion, prepared warm, of 300 g of maleic anhydride in 1,500 g of 1-hexene was then combined with a polymerization initiator solution, consisting of 13.8 g of bis-(4-t-butylcyclohexyl) peroxydicarbonate in 500 ml of 1-hexene, in a volumetric flow ratio of about 3:1 and the mixture was sprayed continuously, over 6 hours, onto the agitated initial charge. The molar ratio of maleic anhydride to 1-hexene was about 1:7.2. During the polymerization, the bed of solids was circulated. The polymerization temperature was 75° C. The excess 1-hexene was removed continuously from the reaction zone by evaporation. The copolymer obtained had a K value of 35.

EXAMPLE 7

Preparation of a copolymer of maleic anhydride and i-butene 1,500 g of a maleic anhydride/i-butene copolymer were introduced into a steel apparatus similar to that described in Example 1. The pressure in the reactor was about 4.5 bar. The oil bath was set to 65° C. A dispersion, prepared warm under pressure, of 600 g of maleic anhydride in 2,100 g of i-butene was then combined, in a static mixer, with an initiator solution consisting of 27.6 g of bis-(4-t-butylcyclohexyl)peroxydicarbonate in 300 g of i-butene containing 1 g of hydroquinone monomethyl ether, in a volumetric flow ratio of about 8:1, and the mixture was sprayed continuously, over 8 hours, onto the agitated initial charge. The molar ratio of maleic anhydride employed to i-butene was about 1:9. During the polymerization, the bed of solids was thoroughly circulated. The polymerization temperature was 65° C. The excess i-butene introduced into the polymerization zone was removed continuously by evaporative pressure release. A copolymer of maleic anhydride and i-butene, having a K value of 35, was obtained; the particle diameter of the polymer was from 0.1 to 3 mm. The copolymer is used as a scale inhibitor in detergents.

EXAMPLE 8

Preparation of a copolymer of maleic anhydride and diisobutene 1,500 g of a maleic anhydride/diisobutene copolymer were introduced into the apparatus described in Example 1. The reaction pressure was 100 mm Hg. The oil bath was set to 80° C. A dispersion, prepared warm, of 300 g of maleic anhydride in 2,100 g of diisobutene (a mixture of 80% by weight of 2,4,4'-trimethyl-1-pentene and 20% by weight of 2,4,4'-trimethyl-2-pentene) was then combined, in a static mixer, with an initiator solution consisting of 13.8 g of bis-(4-t-butylcyclohexyl) peroxydicarbonate in 500 ml of diisobutene, in a volumetric flow ratio of about 6:1, and the mixture was sprayed continuously, over 6 hours, onto the agitated initial charge. The molar ratio of maleic anhydride to diisobutene was about 1:7.2. During the polymerization, the bed of solids was thoroughly circulated. The polymerization temperature was 75° C. The excess diisobutene was removed continuously from the reaction zone by evaporation. The copolymer of maleic anhydride and diisobutene had a K value of 46. The particle diameter of the polymer was from 0.1 to 2 mm. The copolymer is useful as a surface-sizing agent for paper.

EXAMPLE 9

Preparation of a copolymer of maleic anhydride and i-butene, in the molar ratio of 1:1, with pentaerythritol triallyl ether The polymerization apparatus used was as described in Example 1, but made of steel instead of the glass components. 1,500 g of a copolymer of maleic anhydride and i-butene, of particle diameter from 1 to 2 mm, were introduced and heated to 60° C., with constant circulation. The pressure was set at about 4.5 bar by introducing nitrogen. A dispersion, prepared under pressure, of 300 g of maleic anhydride, 5 g of pentaerythritol triallyl ether and 4.98 g of benzoin in 1,050 g of i-butene was then combined with a solution of a polymerization initiator mixture, consisting of 7.02 g of bis-(4-t-butylcyclohexyl) peroxydicarbonate and 3.37 g of dioctanoyl peroxide in 150 g of i-butene, in a static mixer, in a volumetric flow ratio of about 8:1, and the mixture was sprayed continuously, over 6 hours, onto the bed of solids. The molar ratio of maleic anhydride employed to i-butene was about 1:9, and the polymerization temperature was 60° C. During the polymerization, the material in the polymerization zone was kept in the powder state, and the excess i-butene was released continuously via a constant-pressure valve. A slightly crosslinked copolymer of maleic anhydride and i-butene in the molar ratio of about 1:1 was obtained, having a K value of 65 (measured on a 0.1% strength solution in acetone). After neutralization, this polymer can be used as a thickener for paper-coating compositions or aqueous print pastes.

We claim:

1. A process for the preparation of a maleic anhydride copolymer powder by copolymerization, wherein a solution or dispersion of maleic anhydride in a $C_1$–$C_8$-alkyl vinyl ether and/or a $C_3$–$C_{10}$-alkene, containing from 3 to 25 moles of the $C_1$–$C_8$-alkyl vinyl ether and/or $C_3$–$C_{10}$-alkene per mole of maleic anhydride, is brought into contact with a powder bed under polymerization conditions, and is polymerized in the bed whilst the reaction mass is circulated and the powder state is maintained, and the heat generated during polymerization is removed by evaporating excess monomer which boils lower than maleic anhydride.

2. A process as claimed in claim 1, wherein the copolymerization is carried out in the presence of from 0 to 25 mole %, based on maleic anhydride, of ethylenically unsaturated $C_3$–$C_5$-carboxylic acids, their esters, amides, nitriles and/or vinyl esters, or styrene.

3. A process as claimed in claim 2, wherein the copolymerization is carried out in the presence of from 0 to 5 mole %, based on maleic anhydride, of a crosslinking monomer.

4. A process as claimed in claim 1, wherein the temperature during copolymerization is from 20° C. below to 5° C. below the start of the softening range of the particular copolymer, while the pressure is from 0.05 to 100 bar.

5. A process as claimed in claim 1, wherein a mixture of polymerization initiators having different decomposition temperatures is used.

6. A process as claimed in claim 1, wherein, following the main polymerization, a polymerization initiator which decomposes at a higher temperature than the initiator used for the main polymerization is added, and an after-polymerization is carried out at a temperature above the temperature of the main polymerization.

* * * * *